(12) United States Patent
Inoue et al.

(10) Patent No.: US 10,137,821 B2
(45) Date of Patent: Nov. 27, 2018

(54) LOW-BEAM-COLOR-TEMPERATURE-VARIABLE HEADLIGHT UNIT

(71) Applicant: YAMAHA HATSUDOKI KABUSHIKI KAISHA, Iwata-shi, Shizuoka (JP)

(72) Inventors: Takehiro Inoue, Iwata (JP); Yumi Kimura, Iwata (JP); Fang-yu Hsu, Taoyuan (TW)

(73) Assignee: YAMAHA HATSUDOKI KABUSHIKI KAISHA, Iwata-Shi, Shizuoka (JP)

( * ) Notice: Subject to any disclaimer, the term of this patent is extended or adjusted under 35 U.S.C. 154(b) by 0 days.

(21) Appl. No.: 15/919,413

(22) Filed: Mar. 13, 2018

(65) Prior Publication Data

US 2018/0264995 A1 Sep. 20, 2018

(30) Foreign Application Priority Data

Mar. 14, 2017 (JP) .................................. 2017-048902
Dec. 12, 2017 (JP) .................................. 2017-237769

(51) Int. Cl.
*B60Q 1/04* (2006.01)
*H05B 41/36* (2006.01)
(Continued)

(52) U.S. Cl.
CPC ......... *B60Q 1/0408* (2013.01); *B60Q 1/0041* (2013.01); *F21S 41/141* (2018.01);
(Continued)

(58) Field of Classification Search
CPC combination set(s) only.
See application file for complete search history.

(56) References Cited

U.S. PATENT DOCUMENTS

2004/0240219 A1* 12/2004 Oishi ..................... F21S 41/18
362/487
2007/0041207 A1 2/2007 Ishida
(Continued)

FOREIGN PATENT DOCUMENTS

JP 4535965 B2 9/2010
JP 2013-51032 A 3/2013

*Primary Examiner* — Kevin Quarterman
(74) *Attorney, Agent, or Firm* — Rabin & Berdo, P.C.

(57) ABSTRACT

A low-beam-color-temperature-variable headlight unit includes a case, a condenser lens, a high-color-temperature light emitting diode, a low-color-temperature light emitting diode, and a low-beam-color-temperature control unit. The high-color-temperature light emitting diode emits high-color-temperature light. The high-color-temperature light emitting diode provides illumination of a first illuminated area. The low-color-temperature light emitting diode provides illumination of a second illuminated area that overlaps the first illuminated area at least partly. The low-color-temperature light emitting diode emits low-color-temperature light having a lower color temperature than the high-color-temperature light. The low-beam-color-temperature control unit is capable of adjusting the color temperature of the low beam by adjusting the quantity of light emitted from the high-color-temperature light emitting diode and the quantity of light emitted from the low-color-temperature light emitting diode.

11 Claims, 6 Drawing Sheets

(51) Int. Cl.
  *F21S 41/141* (2018.01)
  *F21S 41/19* (2018.01)
  *B60Q 1/00* (2006.01)
  *H05B 33/08* (2006.01)
  *F21S 41/25* (2018.01)
  *F21W 107/17* (2018.01)
  *F21Y 115/10* (2016.01)
  *F21W 102/135* (2018.01)

(52) U.S. Cl.
  CPC .............. *F21S 41/19* (2018.01); *F21S 41/25* (2018.01); *H05B 33/086* (2013.01); *H05B 41/36* (2013.01); *F21W 2102/135* (2018.01); *F21W 2107/17* (2018.01); *F21Y 2115/10* (2016.08)

(56) References Cited

U.S. PATENT DOCUMENTS

| | | | |
|---|---|---|---|
| 2007/0242463 A1 | 10/2007 | Futami | |
| 2009/0303694 A1* | 12/2009 | Roth | C09K 11/7734 362/84 |
| 2013/0194795 A1* | 8/2013 | Onaka | F21V 5/04 362/231 |

* cited by examiner

LOW-BEAM-COLOR-TEMPERATURE-VARIABLE HEADLIGHT UNIT

CROSS-REFERENCE TO RELATED APPLICATION

This application claims the benefit of the earlier filing date of Japanese Application No. 2017-048902, filed Mar. 14, 2017, and Japanese Application No. 2017-237769, filed Dec. 12, 2017, the contents of which are entirely incorporated herein by reference.

BACKGROUND OF THE INVENTION

1. Field of the Invention

The present invention relates to a headlight unit. More particularly, the present invention relates to a low-beam-color-temperature-variable headlight unit.

2. Description of the Related Art

Leaning vehicles and other vehicles have a headlight unit for forward lighting. As a light source of the headlight unit, for example, a white light source is used.

A headlight unit adaptable to various driving conditions is disclosed in Japanese Patent No. 4535965 (Patent Literature 1), for example. This headlight unit includes a primary lighting unit that emits a low beam. The headlight unit disclosed in Patent Literature 1 further includes an additional lighting unit to be selectively turned on while the primary lighting unit is on, so that an overlap illuminated area that is an area illuminated by both the primary lighting unit and the additional lighting unit can be made. Thus, the headlight unit disclosed in Patent Literature 1 can adjust the quantity of light for illumination of a specified area.

However, the headlight unit disclosed in Patent Literature 1 is large because the headlight unit includes a primary lighting unit and an additional lighting unit.

SUMMARY OF THE INVENTION

An object of the present invention is to provide a headlight unit that inhibits an increase in size and is adaptable to various driving conditions.

DETAILED DESCRIPTION

The inventors first studied the effects of a headlight unit that can adjust the quantity of light for illumination of a specified area to adapt to various driving conditions. As a result, they confirmed that such a headlight unit that can adjust the quantity of light for illumination of a specified area brings out an advantageous effect. Moreover, the inventors found out from their studies that it is possible to make various illuminated areas for various driving conditions with a low beam by adjusting the color temperature of the low beam.

Then, the inventors tried to attach a color filter to a headlight unit to change the color temperature of the low beam. However, in order to provide the headlight unit with a freely-attachable/detachable filter, a filter and a fixture are necessary. This results in an increase in the size of the headlight unit. Additionally, in order to adjust the color temperature of the low beam, more than one filter is necessary. Therefore, the headlight unit becomes still larger.

The inventors hit upon a new technical idea. The idea of adjusting the color temperature of light emitted from one light source by using more than one filter inevitably brings the result of an increase in size. Therefore, the inventors created a new technical concept that it is possible to adjust the color temperature of a low beam by using two or more light emitting diodes which emit lights having different color temperatures and by combining different illuminated areas made by low beams having different color temperatures. Then, the inventors studied a headlight unit in specific terms based on this concept.

Headlight units can be classified into a monofocal type, a projector type and a parabolic type, for example. In a monofocal-type headlight unit, light emitted from a light source enters a condenser lens directly, and the light is used for illumination of an area ahead of a vehicle. In a projector-type headlight unit, light emitted from a light source is reflected and collected by a reflector. The collected and reflected light passes through a condenser lens and is used for illumination of an area ahead of a vehicle. In a parabolic-type headlight unit, light emitted from a light source is reflected by a parabolic reflector disposed around the light source. The reflected light is used for illumination of an area ahead of a vehicle.

The inventors thought about arranging a white light emitting diode and a yellow light emitting diode side by side in the right-left direction in a projector- or parabolic-type headlight unit. In order to additionally provide a yellow light emitting diode in an existing headlight unit having a white light emitting diode such that the yellow light emitting diode and the white light emitting diode are arranged side by side in the right-left direction, it is necessary to shift the position of the white light emitting diode from the center of the vehicle. This is to make a space in the headlight unit for the yellow light emitting diode. In the projector- or parabolic-type headlight unit, the optical path is designed minutely to achieve a desired quantity of light, a desired illuminated area and a desired cutoff line. Therefore, shifting the position of the white light emitting diode in the existing headlight unit causes a change in the optical path, which makes it difficult to achieve the desired quantity of light, the desired illuminated area and the desired cutoff line.

A monofocal-type headlight unit has a light distribution characteristic which is not so influential as that of a projector- or parabolic-type headlight unit. Specifically, in a monofocal-type headlight unit, light from a light source is neither reflected nor collected before reaching a condenser lens. Accordingly, the quantity of light entering the condenser lens from the light source in a monofocal-type headlight unit is smaller than that in a projector-type or any other type of headlight unit.

As described above, a monofocal-type headlight unit has a simple optical path. Therefore, even when the position of a white light emitting diode originally provided in a monofocal-type headlight unit is shifted, the light distribution in the headlight unit does not change largely. Accordingly, even when a yellow light emitting diode is additionally provided in the monofocal-type headlight unit and is arranged side by side with the white light emitting diode, it does not make a large difference in the quantity of light emitted from the headlight unit and in the area illuminated by the headlight unit. Consequently, the inventors found out that a positional shift of the light source in a monofocal-type headlight unit does not create a need to make a big change in the design of the optical path and that it is possible to make use of an existing monofocal-type headlight unit.

The headlight unit needs to irradiate a high beam and a low beam having a cut-off line. If the white light emitting diode and the yellow light emitting diode are arranged in the headlight unit side by side in the up-down direction, the position in the up-down direction of the existing white light emitting diode changes. Therefore, the position of the existing cutoff line changes. However, if the white light emitting diode and the yellow light emitting diode are arranged side by side in the right-left direction, the position in up-down direction of the cutoff line does not change. Accordingly, the inventors have found that by arranging the yellow light emitting diode and the white light emitting diode side by side in the mono-focus type headlight unit, the position of the existing cutoff line can be maintained and there is no need to make a big change in the design of the optical path.

A low-beam-color-temperature-variable headlight unit (which will hereinafter be referred to simply as a headlight unit) according to an embodiment of the present invention was made on the basis of the findings above. The headlight unit according to the embodiment includes a case, a condenser lens, a high-color-temperature light emitting diode, a low-color-temperature light emitting diode, and a low-beam-color-temperature control unit. The condenser lens includes a low-beam output surface from which a low beam outgoes, and a light receiving surface located behind the low-beam output surface with respect to a front-back direction of the case. The high-color-temperature light emitting diode is located inside the case, at a position nearer to a center line of the light receiving surface than to a right end and a left end of the light receiving surface with respect to a right-left direction of the case. The high-color-temperature light emitting diode is configured to illuminate a first illuminated area with light passing through the light receiving surface and outgoing from the low-beam output surface, and the high-color-temperature light emitting diode includes a high-color-temperature light emitting surface from which high-color-temperature light is emitted. The low-color-temperature light emitting diode is located inside the case, side by side with the high-color-temperature light emitting diode in the right-left direction of the case, at a position nearer to the center line of the light receiving surface than to the right end and the left end of the light receiving surface with respect to the right-left direction of the case. The low-color-temperature light emitting diode is configured to illuminate a second illuminated area, which overlaps the first illuminated area at least partly, with light passing through the light receiving surface and outgoing from the low-beam output surface, and the low-color-temperature light emitting diode includes a low-color-temperature light emitting surface from which low-color-temperature light is emitted. The low-beam-color-temperature control unit is capable of adjusting the color temperature of the low beam by adjusting the quantity of light emitted from the high-color-temperature light emitting diode and the quantity of light emitted from the low-color-temperature light emitting diode.

The headlight unit according to the embodiment includes a high-color-temperature light emitting diode and a low-color-temperature light emitting diode. The area illuminated by the high-color-temperature light emitting diode overlaps the area illuminated by the low-color-temperature light emitting diode. In the overlap illuminated area, the high-color-temperature light emitted from the high-color-temperature light emitting diode and the low-color-temperature light emitted from the low-color-temperature light emitting diode are mixed together. Therefore, it is possible to adjust the color temperature of the overlap illuminated area by adjusting the quantity of light emitted from the high-color-temperature light emitting diode and the quantity of light emitted from the low-color-temperature light emitting diode. The headlight unit according to the embodiment is a monofocal-type headlight unit. Therefore, a positional shift of a light emitting diode in the headlight unit causes no great changes in the quantity of light emitted from the headlight unit, in the light distribution and the like. In the headlight unit according to the embodiment, the high-color-temperature light emitting diode and the low-color-temperature light emitting diode are arranged side by side in the right-left direction. Accordingly, the position of the cutoff line of the headlight unit according to the embodiment is the same as that of the existing headlight unit. Thus, the headlight unit according to the embodiment can be made from an existing headlight unit by only shifting the position of the light emitting diode already provided therein without a need to redesign the optical path.

In the above-described headlight unit, the high-color-temperature light emitting diode is disposed preferably symmetrically with the low-color-temperature light emitting diode about the center line with respect to the right-left direction.

In this case, the area illuminated by the headlight unit is symmetric in the left-right direction. Therefore, the headlight unit is suited to be used as a headlight unit in a motorcycle.

In the above-described headlight unit, the high-color-temperature light emitting diode is preferably a white light emitting diode, and the low-color-temperature light emitting diode is preferably a yellow light emitting diode.

In this case, the headlight unit is suited to be used as a headlight unit in a vehicle. The light emitted from the yellow light emitting diode scatters less than the light emitted from the white light emitting diode. Therefore, the headlight unit including a white light emitting diode and a yellow light emitting diode is suited to be used as a headlight unit in a vehicle, and then, scattering of light emitted from the headlight unit can be suppressed.

In the above-described headlight unit, after a light-quantity adjustment, the quantity of light emitted from the low-color-temperature light emitting diode is preferably greater than the quantity of light emitted from the high-color-temperature light emitting diode.

It is preferred that a light illuminating an area ahead of a vehicle is long-wavelength light to provide brighter illumination. Generally, the rate of long-wavelength light in low-color-temperature light is higher than the rate of long-wavelength light in high-color-temperature light. Therefore, when the quantity of light emitted from the low-color-temperature light emitting diode is greater than the quantity of light emitted from the high-color-temperature light emitting diode, the light emitted from the low-color-temperature light emitting diode is dominant. Then, because of the dominant light emitted from the low-color-temperature light emitting diode, it is possible to provide brighter illumination of an area ahead of the vehicle while suppressing scattering of light.

In the above-described headlight unit, after a light-quantity adjustment, the total of the quantity of light emitted from the high-color-temperature light emitting diode and the quantity of light emitted from the low-color-temperature light emitting diode may be equal to a maximum quantity of light the high-color-temperature light emitting diode can emit during operation.

After a light-quantity adjustment, the quantity of light emitted from the high-color-temperature light emitting diode may be equal to the maximum quantity of light the high-color-temperature light emitting diode can emit during operation, and the quantity of light emitted from the low-color-temperature light emitting diode may be equal to a maximum quantity of light the low-color-temperature light emitting diode can emit during operation.

After a light-quantity adjustment, the quantity of light emitted from the high-color-temperature light emitting diode may be equal to the maximum quantity of light the high-color-temperature light emitting diode can emit during operation, and the quantity of light emitted from the low-color-temperature light emitting diode may be less than the maximum quantity of light the low-color-temperature light emitting diode can emit during operation.

After a light-quantity adjustment, the quantity of light emitted from the high-color-temperature light emitting diode may be less than the maximum quantity of light the high-color-temperature light emitting diode can emit during operation, and the quantity of light emitted from the low-color-temperature light emitting diode may be equal to the maximum quantity of light the low-color-temperature light emitting diode can emit during operation.

After a light-quantity adjustment, the quantity of light emitted from the high-color-temperature light emitting diode may be less than the maximum quantity of light the high-color-temperature light emitting diode can emit during operation, and the quantity of light emitted from the low-color-temperature light emitting diode may be less than the maximum quantity of light the low-color-temperature light emitting diode can emit during operation.

In sum, the quantity of light emitted from the high-color-temperature light emitting diode and the quantity of light emitted from the low-color-temperature light emitting diode should be adjusted in consideration of the weather and other conditions.

In the above-described headlight unit, the low-beam-color-temperature control unit adjusts the quantity of light emitted from the high-color-temperature light emitting diode and the quantity of light emitted from the low-color-temperature light emitting diode preferably in response to a signal sent from a mobile terminal.

In this case, even after the headlight unit is fixed in a leaning vehicle, the color temperature in the overlap illuminated area where the first illuminated area and the second illuminated area overlap each other can be adjusted in response to the driver's operating his/her mobile terminal.

In the above-described headlight unit, the overlap illuminated area where the first illuminated area and the second illuminated area overlap each other may be greater than a portion of the first illuminated area without overlapping the second illuminated area and greater than a portion of the second illuminated area without overlapping the first illuminated area.

In this case, the headlight unit can adjust the color temperature in the greatest part of the area illuminated by the low beam (the combined area of the first illuminated area and the second illuminated area). Therefore, the headlight unit is adaptable to various driving conditions.

A headlight unit according to the present invention inhibits an increase in size and is adaptable to various driving conditions.

In this specification, "front" means a farther side in the direction from a light emitting diode toward a condenser lens, which will be described later, along the optical axis of the condenser lens. In this specification, "back" means a farther side in the direction from the condenser lens toward the light emitting diode along the optical axis of the condenser lens. In this specification, "left" means the left side of a vehicle which the headlight unit is attached to. In this specification, "right" means the right side of the vehicle which the headlight unit is attached to. In this specification, "up" means the upper side of the vehicle which the headlight unit is attached to. In this specification, "down" means the lower side of the vehicle which the headlight unit is attached to. Accordingly, in the following description of a headlight unit, "front", "back", "right", "left", "up" and "down" mean front, back, right, left, up and down viewed from the rider of a vehicle.

In the drawings, arrow F indicates forward from a headlight unit. Arrow B indicates backward from the headlight unit. Arrow U indicates upward from the headlight unit. Arrow D indicates downward from the headlight unit. Arrow R indicates rightward from the headlight unit. Arrow L indicates leftward from the headlight unit.

In this specification, the term "quantity of light" means the quantity of light defined in IEC (International Electrotechnical Commission) 845-01-28, and lumen-second [lm-s] is used as the unit. In this specification, the term "maximum quantity of light a light emitting diode can emit during operation" means the quantity of light emitted from a light emitting diode when a rated current is applied to the light emitting diode.

In this specification, the term "illuminated area" means the area on a screen illuminated by a headlight unit measured by the method set forth in JIS D1619 (1977).

An embodiment of the present invention will hereinafter be described with reference to the drawings. In the drawings, same or equivalent parts are denoted by the same reference symbols, and descriptions of these parts will not be repeated. The following description is of a case where the vehicle provided with a headlight unit is a motorcycle.

Figure 1:
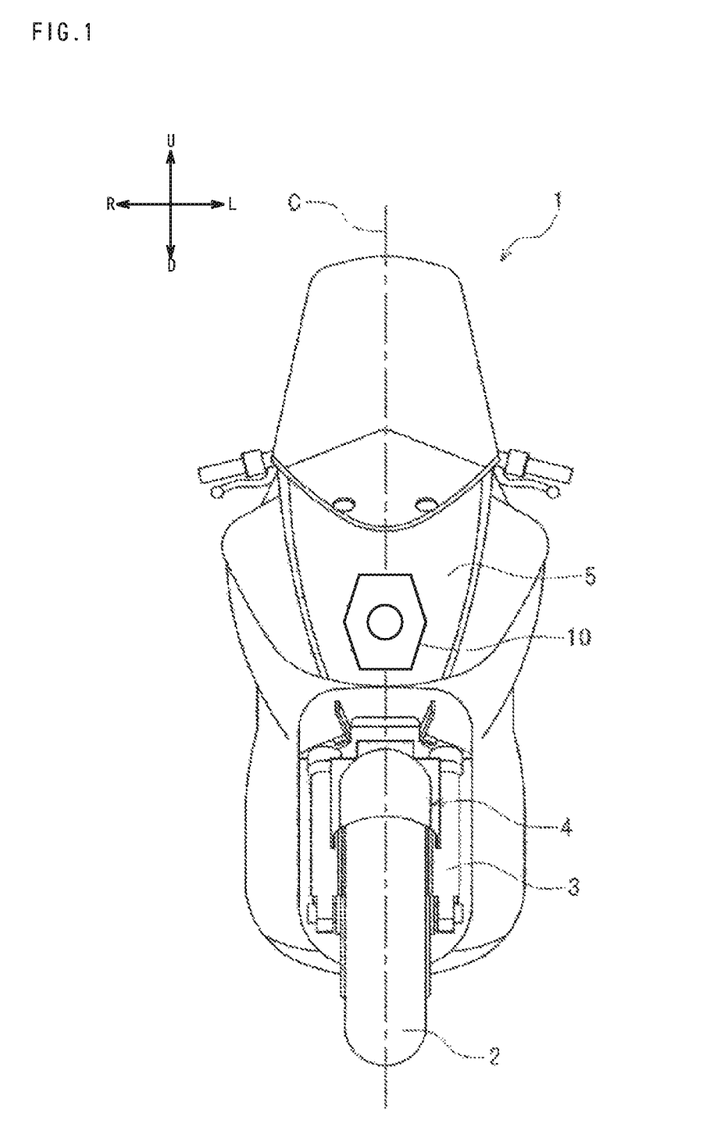
FIG. 1 is a front view of a leaning vehicle.

FIG. 1 is a front view of a motorcycle. The motorcycle 1 includes a front wheel 2, a rear wheel (not shown), and a power unit (not shown) driving the rear wheel. The front wheel 2 is supported by a front fork 3. A front fender 4 is provided over the front wheel 2. A front cowl 5 is provided above the front fender 4. The front cowl 5 is in front of a head pipe (not shown).

A headlight unit 10 is fixed to the front cowl 5. The headlight unit 10 may be fixed to any part of the front cowl 5. For example, the headlight unit 10 may be fixed to a bracket supported by the motorcycle body frame.

Figure 2:
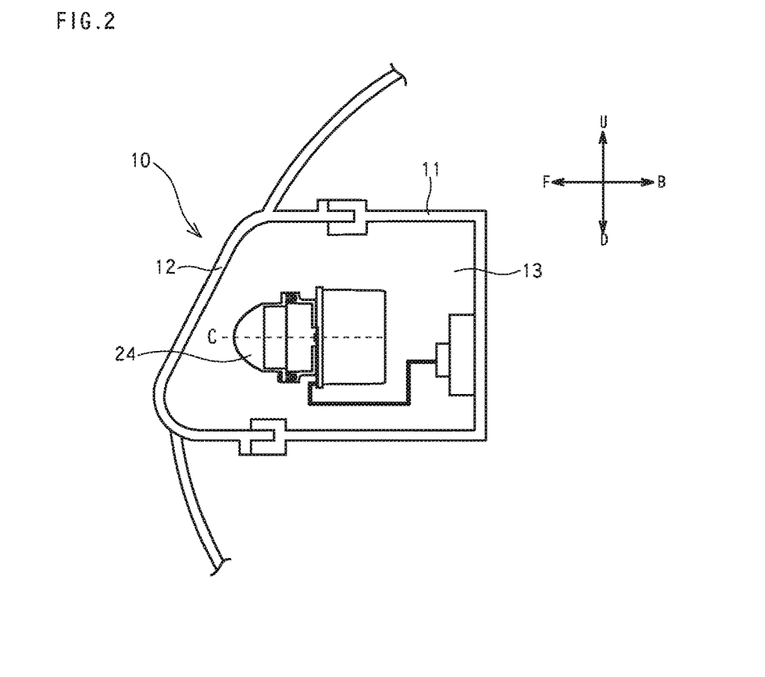
FIG. 2 is a longitudinal sectional view of the vehicle shown in FIG. 1, showing a portion near a headlight.

FIG. 2 is a longitudinal sectional view of the headlight unit shown in FIG. 1, around the headlight unit. In reference to FIG. 2, the headlight unit 10 is supported by a housing 11. The headlight unit 10 may be supported by the housing 11 directly or may be supported by the housing 11 indirectly via any other member. The housing 11 has an opening in the front. An outer cover 12 is provided in front of the opening of the housing 11 and integrated with the housing 11. The housing 11 and the outer cover 12 integrate together and thereby form a headlight chamber 13. The headlight unit 10 is located in the headlight chamber 13. Light outgoing from a condenser lens 24 of the headlight unit 10 passes through the outer cover 12 and illuminates an area ahead of the motorcycle.

[Headlight Unit]

Figure 3:
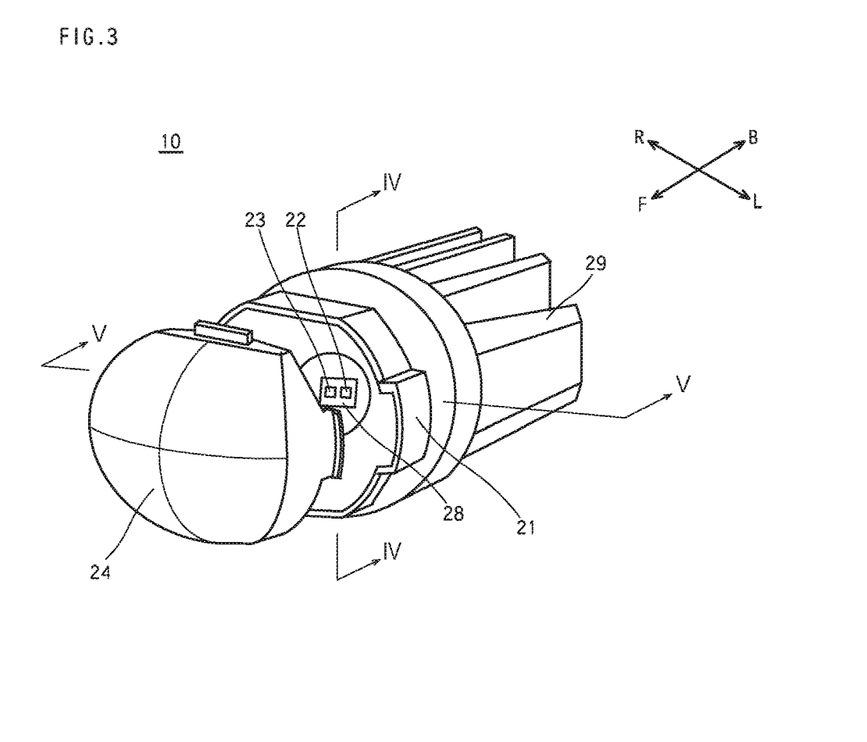
FIG. 3 is a perspective view of a headlight unit according to an embodiment of the present invention.
Figure 4:
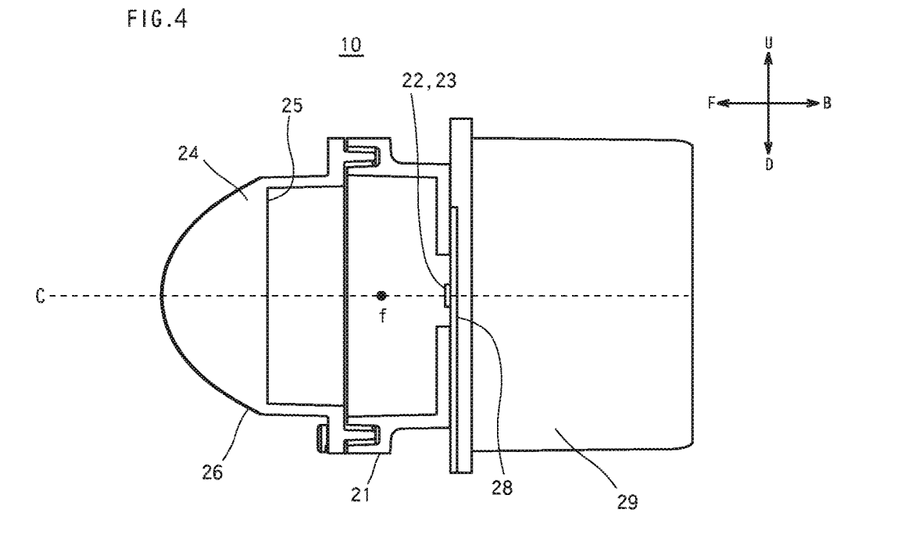
FIG. 4 is a sectional view of the headlight unit along the line IV-IV in FIG. 3.
Figure 5:
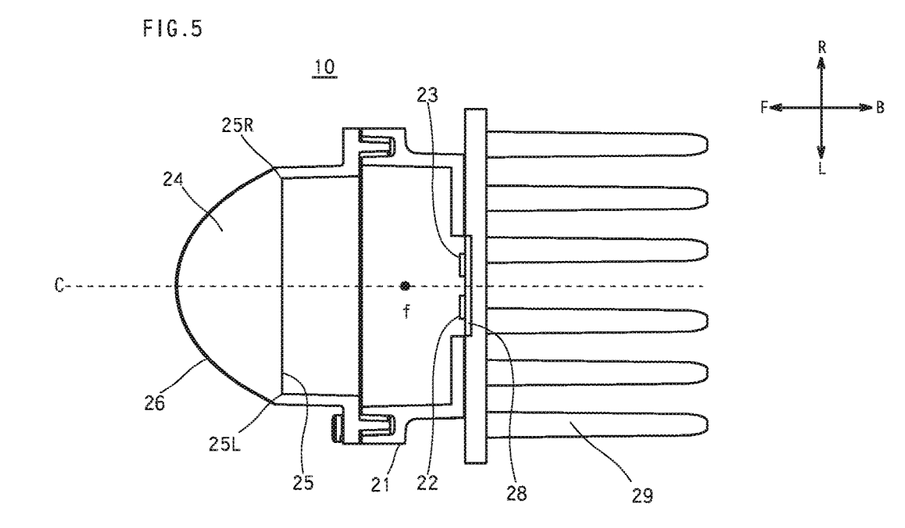
FIG. 5 is a sectional view of the headlight unit along the line V-V in FIG. 3.

FIG. 3 is a perspective view of a headlight unit according to the present embodiment. FIG. 3 shows a state where the condenser lens 24 has been detached from a case 21. FIG. 4 is a sectional view along the line IV-IV in FIG. 3. FIG. 5 is a sectional view along the line V-V in FIG. 3. FIGS. 4 and 5 show a state where the condenser lens 24 is attached to the case 21. In reference to FIGS. 3, 4 and 5, the headlight unit 10 includes the case 21, a white light emitting diode (white LED) 22, a yellow light emitting diode (yellow LED) 23, and the condenser lens 24.

[Case]

The case 21 is a box with an open side in the front. The case 21 is capable of housing the white LED 22 and the yellow LED 23. The case 21 includes a douser (not shown). The douser blocks a part of light emitted from the white LED 22 and a part of light emitted from the yellow LED 23. Thus, the douser forms a cutoff line at the upper end of the range of illumination provided by the white LED 22 and the yellow LED 23.

[Condenser Lens]

In reference to FIGS. 4 and 5, the condenser lens 24 is located in front of the white LED 22 and the yellow LED 23. The condenser lens 24 is fixed to the case 21. The condenser lens 24 includes a low-beam output surface 26 and a light receiving surface 25.

The light receiving surface 25 is located behind the low-beam output surface 26 with respect to the front-back direction of the case. The light receiving surface 25 receives light from the white LED 22 and the yellow LED 23. The light receiving surface 25 is flat. The low-beam output surface 26 outputs the light that entered the condenser lens 24 from the light receiving surface 25 as a low beam. The low-beam output surface 26 curves forward. In other words, the condenser lens 24 is a convex lens.

The headlight unit 10 according to the present embodiment is a monofocal-type headlight unit, wherein the light emitted from the white LED 22 and the yellow LED 23 enters the condenser lens 24 directly.

[Light Emitting Diode (LED)]

Figure 6:
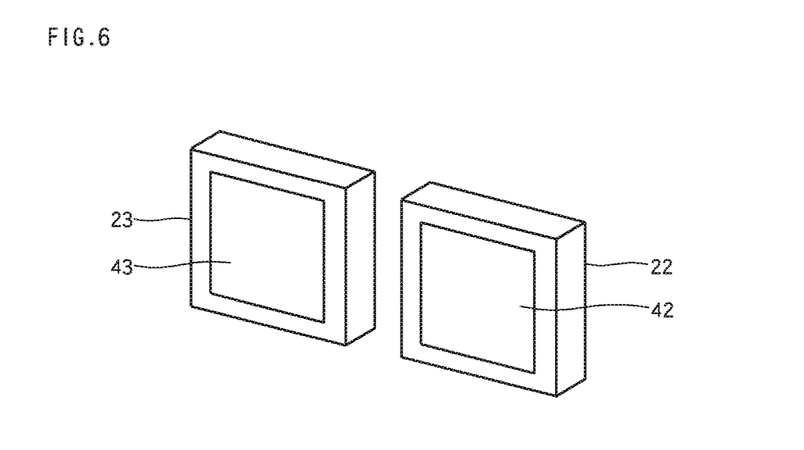
FIG. 6 is a perspective view schematically showing a white light emitting diode.

FIG. 6 is a perspective view schematically showing the white LED and the yellow LED. In reference to FIG. 6, the white LED 22 and the yellow LED 23 are of a chip type. The white LED 22 has a white light emitting surface 42 (high-color-temperature light emitting surface). The yellow LED 23 has a yellow light emitting surface 43 (low-color-temperature light emitting surface). When an electric current flows through the white LED 22, white light is emitted from the white light emitting surface 42. When an electric current flows through the yellow LED 23, yellow light, which has a lower color temperature than white light, is emitted from the yellow light emitting surface 43.

In reference to FIG. 5, the white LED 22 is disposed in the case 21. Regarding the position of the white LED 22 with respect to the right-left direction of the case 21, the white LED 22 is nearer to the center line C than to the left end 25L and the right end 25R of the light receiving surface 25. More specifically, in the right-left direction of the case 21, the distance between the right side of the white LED 22 and the center line C is shorter than the distance between the left side of the white LED 22 and the left end 25L of the light receiving surface 25. The white light emitted from the white LED 42 enters the light receiving surface 25 directly.

The yellow LED 23 is disposed in the case 21. The yellow LED 23 is arranged side by side with the white LED 22 in the right-left direction of the case 21. Regarding the position of the yellow LED 23 in the right-left direction of the case 21, the yellow LED 23 is nearer to the center line C than to the left end 25L and the right end 25R of the light receiving surface 25. More specifically, in the right-left direction of the case 21, the distance between the right side of the yellow LED 23 and the center line C is shorter than the distance between the right side of the yellow LED 23 and the right end 25R of the light receiving surface 25. The yellow light emitted from the yellow LED 43 enters the light receiving surface 25 directly.

The white light emitting surface 42 is disposed symmetrically with the yellow light emitting surface 43 about the center line C passing the right-left center of the light receiving surface 25. The white LED 22 and the yellow LED 23 are located behind the focal point f of the condenser lens 24.

The color temperature of the white light emitted from the white LED 22 is about 5000 to 6000 [K]. The color temperature of the yellow light emitted from the yellow LED 23 is about 2700 to 3000 [K]. Thus, the color temperature of the yellow light is lower than the color temperature of the white light. Generally, the rate of long-wavelength light in low-color-temperature light is higher than the rate of long-wavelength light in high-color-temperature light. Also, the rate of short-wavelength light in low-color-temperature light is lower than the rate of short-wavelength light in high-color-temperature light. Accordingly, the light emitted forward from the yellow LED 23 contains light with long wavelengths (long-wavelength light) at a higher rate than the light emitted forward from the white LED 22 does. Long-wavelength light is unlikely to scatter. Therefore, the light emitted from the yellow LED 23 is less likely to scatter than the light emitted from the white LED 22.

Next, the optical path in the monofocal-type headlight unit and the area illuminated by the monofocal-type headlight unit will be described.

[Optical Path]

In reference to FIG. 4, the optical path in the headlight unit 10 in a vertical plane is described. The light emitted from the white LED 22 and the light emitted from the yellow LED 23 reach the light receiving surface 25 of the condenser lens 24 directly. The light that has reached the light receiving surface 25 passes through the condenser lens 24 and outgoes from the low-beam output surface 26. Since the condenser lens 24 is a convex lens, the light is refracted by the low-beam output surface 26 in the light condensing direction. The light radiated upward is blocked by the douser. Then, only the light radiated downward travels forward from the headlight unit 10. Accordingly, a low beam is formed.

In reference to FIG. 5, the optical path in the headlight unit 10 in a horizontal plane is described. The light emitted from the white LED 22 and the light emitted from the yellow LED 23 are refracted in the light condensing direction by the condenser lens 24 as in the case described in connection with the vertical plane, and the light travels forward from the headlight unit 10.

[Illuminated Area]

Figure 7:
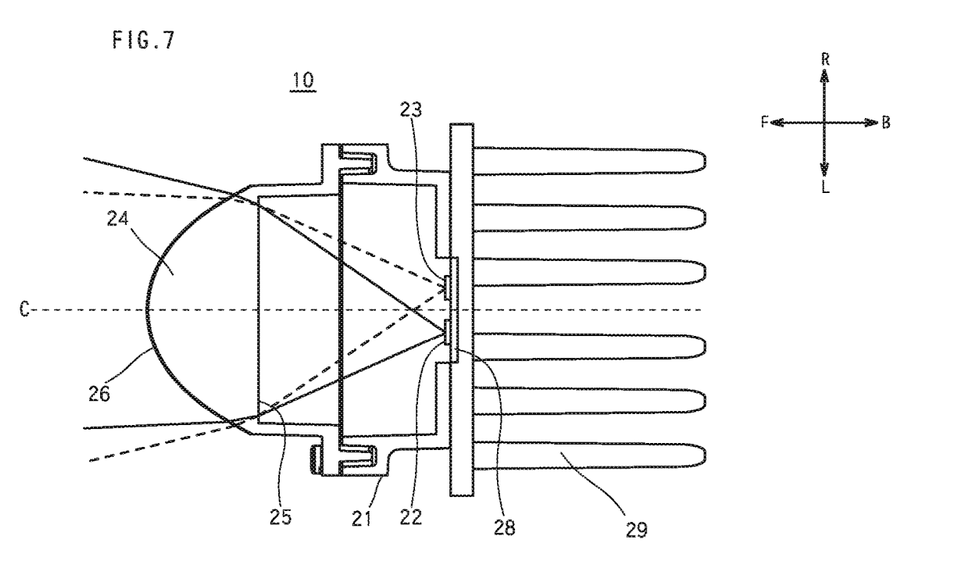
FIG. 7 is a cross-sectional view showing an area illuminated by the headlight unit.
Figure 8:
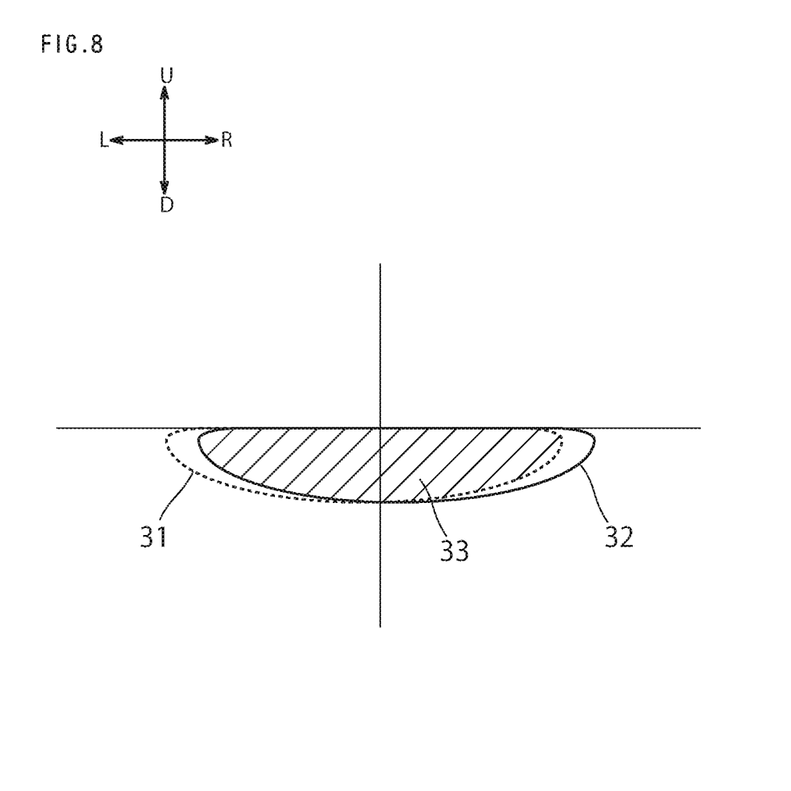
FIG. 8 is a diagram showing the area illuminated by the headlight unit viewed from the rider.

FIG. 7 is a horizontal sectional view showing the range of illumination provided by the headlight unit. FIG. 8 is a view from the rider, showing the area illuminated by the headlight unit. In FIGS. 7 and 8, the range of illumination or the illuminated area provided by the white LED 22 is indicated by a solid line, and the range of illumination or the illuminated area provided by the yellow LED 23 is indicated by a dashed line. In reference to FIGS. 7 and 8, the light emitted from the white LED 22 passes through the light receiving surface 25, outgoes from the low-beam output surface 26 and illuminates a first illuminated area 31. The light emitted from the yellow LED 23 passes through the light receiving surface 25, outgoes from the low-beam output surface 26 and illuminates a second illuminated area 32. The second illuminated area 32 overlaps the first illuminated area 31 at least partly.

In the overlap illuminated area 33 where the first illuminated area 31 and the second illuminated area 32 overlap each other, white light and yellow light are mixed together. Therefore, by adjusting the quantity of light emitted from the white LED 22 and the quantity of light emitted from the yellow LED 23, it is possible to adjust the color temperature in the overlap illuminated area 33 where the first illuminated area 31 illuminated by the white LED 22 and the second illuminated area 32 illuminated by the yellow LED 23 overlap each other. The white LED 22 and the yellow LED 23 are disposed in the central portion of the headlight unit 10 with respect to the right-left direction. Accordingly, the overlap illuminated area 32 where the first illuminated area 31 illuminated by the white LED 22 and the second illuminated area 32 illuminated by the yellow LED 23 overlap each other is greater than the area where the first illuminated area 31 illuminated by the white LED 22 does not overlap the second illuminated area 32 illuminated by the yellow LED 23 (a portion of the first illuminated area 31 without overlapping the second illuminated area 32) and greater than the area where the second illuminated area 32 illuminated by the yellow LED 23 does not overlap the area 31 illuminated the white LED 22 (a portion of the second illuminated area 32 without overlapping the first illuminated area 31). Further, the overlap area where the first illuminated area 31 illuminated by the white LED 22 and the second illuminated area 32 illuminated by the yellow LED 23 overlap each other is greater than the total of the area where the first illuminated area 31 illuminated by the white LED 22 does not overlap the second illuminated area 32 illuminated by the yellow LED 23 and the area where the second illuminated area 32 illuminated by the yellow LED 23 does not overlap the first illuminated area 31 illuminated by the white LED 22. Thus, in the greatest part of the area illuminated with the low beam emitted from the headlight unit 10 (the combined area of the first illuminated area 31 and the second illuminated area 32), the color temperature is variable. Thereby, the headlight unit 10 is adaptable to various riding conditions.

Also, the area illuminated with the low beam emitted from the headlight unit 10 (the combined area of the first illuminated area 31 and the second illuminated area 32) does not change largely even when the color temperature in the overlap area 33 is changed. More specifically, for a change in the color temperature in the overlap area 33, the quantity of light emitted from the white LED 22 and the quantity of light emitted from the yellow LED 23 are changed. For example, for an increase in the color temperature, the quantity of light emitted from the white LED 22 is increased and the quantity of light emitted from the yellow LED 23 is decreased such that the quantity of light illuminating the overlap area 33 does not change largely. Then, the quantity of light illuminating the first illuminated area 31 increases, and the quantity of light illuminating the second illuminated area 32 decreases. Therefore, within the first illuminated area 31, the quantity of light illuminating the part out of the overlap area 33 increases, and within the second illuminated area 32, the quantity of light illuminating the part out of the overlap area 33 decreases. Accordingly, in the part of the second illuminated area 32 out of the overlap area 33, the function of the low beam as an illuminator declines. As a result, it may appear to the rider that the area illuminated with the low beam has changed. When the color temperature is lowered also, it may appear to the rider that the area illuminated with the low beam has changed for the same reason.

In the headlight unit 10, therefore, the white LED 22 and the yellow LED 23 are disposed nearer to the center line C than to the right end and the left end of the light receiving surface 25 with respect to the right-left direction of the case 21. Accordingly, the white LED 22 and the yellow LED 23 are disposed in the central portion of the headlight unit 10 with respect to the right-left direction. Then, the overlap illuminated area 33 occupies the greatest part of the area illuminated with the low beam (the combined area of the first illuminated area 31 and the second illuminated area 32). Consequently, even when the color temperature in the overlap illuminated area 33 is changed, the area illuminated with the low beam does not change largely.

[Positional Shift of Light Source]

As mentioned above, when a light emitting diode (LED) is additionally provided in a projector- or parabolic-type headlight unit including one light emitting diode (LED), a major design change may be necessary. The headlight unit 10 according to the present embodiment can be obtained by additionally providing an LED in an existing headlight unit including one LED without making any major design changes. This point will be described below.

Figure 9:
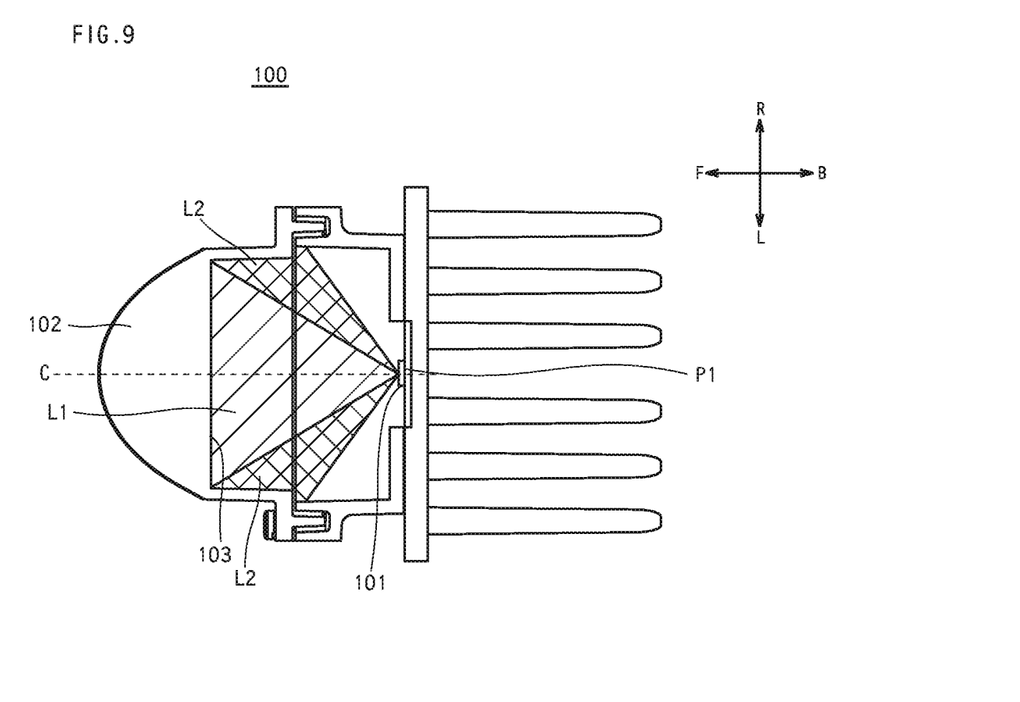
FIG. 9 is a cross-sectional view of a monofocal-type headlight unit with one light emitting diode.

FIG. 9 is a cross-sectional view of a monofocal-type headlight unit including one LED. In reference to FIG. 9, light emitted from an LED 101 travels radially toward a condenser lens 102. Accordingly, the light emitted from the LED 101 includes light L1 entering a light receiving surface 103 of the condenser lens 102 directly, and light L2 not entering the light receiving surface 103 of the condenser lens 102 directly. The light L1 is indicated by linear hatching, and the light L2 is indicated by cross-hatching. The headlight unit according to the present embodiment makes effective use of the light L2 which does not enter the condenser lens directly.

In order to additionally provide an LED in a headlight unit 100 already including one LED as shown in FIG. 9 to arrange the two LEDs side by side in the right-left direction, it is necessary to shift the position of the already-included LED to make a space for the newly-provided LED. In a projector- or parabolic-type headlight unit, a positional shift of the already-included LED will cause a change in the optical path, which makes it difficult to achieve the desired quantity of light, the desired light distribution and the desired cutoff line.

In a case of a monofocal-type headlight unit, however, even when an LED is additionally provided in the headlight unit, the quantity of light, the light distribution and the cutoff line of the headlight unit do not change largely.

Figure 10:
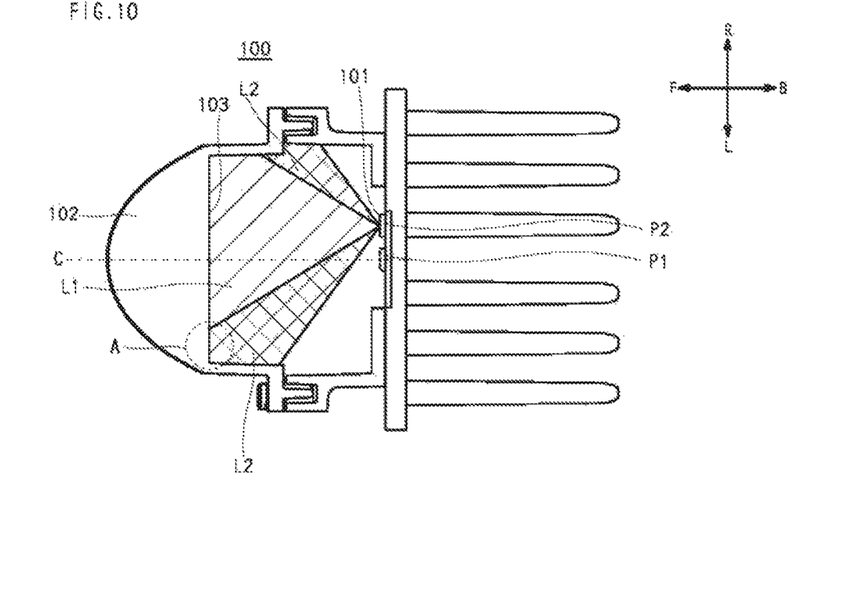
FIG. 10 is a cross-sectional view showing an optical path in the headlight unit shown in FIG. 9 when the light emitting diode of the headlight unit is shifted to right.

FIG. 10 is a cross-sectional view showing the optical path in the headlight unit shown in FIG. 9 when the position of the LED is shifted to the right. In reference to FIGS. 9 and 10, when the position of the LED 101 of the headlight unit 100 is shifted from P1 to P2, a part of the light L1 is prevented from entering the condenser lens 102 directly. The positional shift of the LED 101 to P2, however, permits a part of the light L2 to enter the condenser lens 102 directly. In such a monofocal-type headlight unit, therefore, even when the position of the LED is shifted, the quantity of light directly entering the condenser lens does not change largely. Accordingly, the quantity of light and the distribution of light emitted from the low-beam output surface of the condenser lens does not change largely.

In reference to FIG. 4, in the headlight unit 10 according to the present embodiment, the white LED 22 is disposed side by side with the yellow LED 23 in the right-left direction. Therefore, with respect to the up-down direction, the position of the white LED 22 and the position of the yellow LED 23 of the headlight unit 10 are the same as the position of the single LED in the headlight unit including only one LED. Accordingly, the position of the cutoff line made by the headlight unit 10 is the same as the position of the cutoff line made by the headlight unit including only one LED.

As described above, the headlight unit 10 according to the present embodiment is a monofocal-type headlight unit. Therefore, a positional shift of an LED in the right-left direction makes no large difference in the quantity of light and the light distribution. Also, the white LED 22 and the yellow LED 23 are arranged side by side in the right-left direction. Therefore, the position of the cutoff line of the headlight unit 10 is the same as the position of the cutoff line of the existing headlight unit. Accordingly, even when the position of the LED is shifted to obtain the headlight unit 10, it is not necessary to redesign the optical path. Since it is only necessary to add one more LED to a headlight unit including one LED, the headlight unit does not grow in size. Further, the headlight unit 10 includes two LEDs, which emit different kinds of light that differ in color temperature, and therefore, the headlight unit 10 is adaptable to various riding conditions.

[Low-Beam-Color-Temperature Control Unit]

The headlight unit 10 includes a low-beam-color-temperature control unit 7. The low-beam-color-temperature control unit 7 adjusts the quantity of light emitted from the white LED 22 and the quantity of light emitted from the yellow LED 23. Thereby, the low-beam-color-temperature control unit 7 can adjust the color temperature of the low beam.

In reference to FIGS. 3, 4 and 5, the low-beam-color-temperature control unit includes a control board 28. The control board 28 is a flat plate. The control board 28 is disposed between the case 21 and a heatsink 29. The white LED 22 and the yellow LED 23 are fixed on the front surface of the control board 28. When the headlight unit 10 is fixed in the motorcycle 1, the control board 28 is connected to a power source (not shown). The heatsink 29 is fixed on the back surface of the control board 28. The heatsink 29 has a plurality of radiation fins. The heatsink 29 draws heat from the white LED 22 and the yellow LED 23 via the control board 28 and discharges the heat to the outside.

Figure 11:
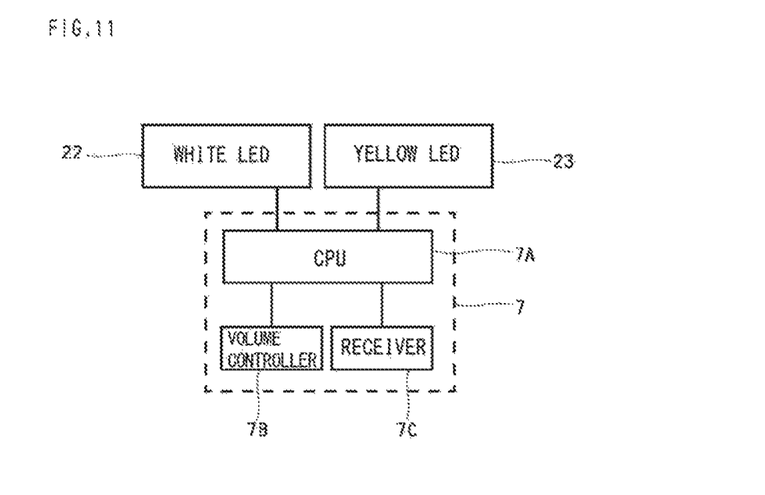
FIG. 11 is a block diagram showing the function of a control unit.

FIG. 11 is a block diagram showing the function of the low-beam-color-temperature control unit. In reference to FIG. 11, the low-beam-color-temperature control unit 7 includes a CPU (central processing unit) 7A, a volume controller 7B, and a receiver 7C. FIG. 11 shows a case where the low-beam-color-temperature control unit 7 includes both a volume controller 7B and a receiver 7C. However, either one of the volume controller 7B and the receiver 7C may be provided in the low-beam-color-temperature control unit 7.

The volume controller 7B is connected to the CPU 7A. When the rider operates the volume controller 7B, a signal is sent to the CPU 7A. The CPU 7A is connected to the white LED 22 and the yellow LED 23. The CPU 7A controls the electric current flowing through the white LED 22 and the electric current flowing through the yellow LED 23 in response to the signal sent from the volume controller 7B. The electric current flowing through the white LED 22 and the electric current flowing through the yellow LED 23 are controlled by PWM (pulse width modulation) control, for example. Thereby, the quantity of light of the white light emitted from the white LED 22 and the quantity of light of the yellow light emitted from the yellow LED 23 are controlled.

FIG. 11 shows a case where the volume controller 7B is connected to the CPU 7A. However, the volume controller 7B may be connected directly to the white LED 22 and the yellow LED 23. In this case, the volume controller 7B is a variable resistor. When the rider operates the volume controller 7B, the values of the electric currents flowing through the white LED 22 and the yellow LED 23 change, and then, the quantity of light emitted from the white LED 22 and the quantity of light emitted from the yellow LED 23 are controlled.

The receiver 7C is connected to the CPU 7A. The receiver 7C is an antenna. The receiver 7C receives a signal transmitted from a mobile terminal. The mobile terminal is a smartphone, for example. When the receiver 7C receives a signal from the mobile terminal, the signal is sent to the CPU 7A. The CPU 7A controls the electric current flowing through the white LED 22 and the electric current flowing through the yellow LED 23 in response to the signal from the receiver 7C. Thereby, the quantity of light of the white light emitted from the white LED 22 and the quantity of light of the yellow light emitted from the yellow LED 23 are controlled.

Next, the quantity of light emitted from the white LED 22 and the quantity of light emitted from the yellow LED 23 of the headlight unit 10 will be described below.

[Quantity of Light]

There is no limit to the quantity of light emitted from the white LED 22 and to the quantity of light emitted from the yellow LED 23, as long as the headlight unit 10 can emit not less than a certain quantity of light sufficient for use in a motorcycle.

For example, the quantity of light emitted from the yellow LED 23 after the light-quantity adjustment for a change in color temperature may be greater than the quantity of light emitted from the white LED 22 after the light-quantity adjustment for the change in color temperature. The light illuminating the area ahead of the motorcycle 1 is desired to be long-wavelength light to provide brighter illumination of the area. Generally, the rate of long-wavelength light in low-color-temperature light (yellow light) is higher than the rate of long-wavelength light in high-color-temperature light (white light). Therefore, when the quantity of light emitted from the yellow LED 23 is greater than the quantity of light emitted from the white LED 22, the light emitted from the yellow LED 23 is dominant. In this case, the light emitted from the headlight unit, which is composed of mainly of the light emitted from the yellow LED 23, is less likely to scatter, and accordingly, the headlight unit can provide brighter illumination of the area ahead of the motorcycle 1.

Also, the total of the quantity of light emitted from the white LED 22 after the light-quantity adjustment for a change in color temperature and the quantity of light emitted from the yellow LED 23 after the light-quantity adjustment for the change in color temperature may be equal to the maximum quantity of light the white LED 22 can emit during operation, for example. In other words, the total quantity of light emitted from the white LED 22 and the yellow LED 23 after the light-quantity adjustment for a change in color temperature may be equal to the quantity of light for a daytime running lamp (or light) (DRL). In this case, the light illuminating the area ahead is equal to the quantity of light for a (DRL), and the headlight unit can be employed as a headlight unit in a motorcycle.

Additionally, the quantity of light emitted from the white LED 22 after the light-quantity adjustment for a change in color temperature may be equal to the maximum quantity of light the white LED 22 can emit during operation, and the quantity of light emitted from the yellow LED 23 after the light-quantity adjustment for the change in color temperature may be equal to the maximum quantity of light the yellow LED 23 can emit during operation.

Moreover, the quantity of light emitted from the white LED 22 after the light-quantity adjustment for a change in color temperature may be equal to the maximum quantity of light the white LED 22 can emit during operation, and the quantity of light emitted from the yellow LED 23 after the light-quantity adjustment for the change in color temperature may be less than the maximum quantity of light the yellow LED 23 can emit during operation.

Further, the quantity of light emitted from the white LED 22 after the light-quantity adjustment for a change in color temperature may be less than the maximum quantity of light the white LED 22 can emit during operation, and the quantity of light emitted from the yellow LED 23 after the light-quantity adjustment for the change in color temperature may be equal to the maximum quantity of light the yellow LED 23 can emit during operation.

Furthermore, the quantity of light emitted from the white LED 22 after the light-quantity adjustment for a change in color temperature may be less than the maximum quantity of light the white LED 22 can emit during operation, and the quantity of light emitted from the yellow LED 23 after the light-quantity adjustment for the change in color temperature may be less than the maximum quantity of light the yellow LED 23 can emit during operation.

In sum, the quantity of light emitted from the white LED 22 and the quantity of light emitted from the yellow LED 23 after the light-quantity adjustment for a change in color temperature should be set appropriately according to the riding condition.

The above embodiment is to facilitate understanding of the present invention and is not to limit the scope of the present invention. It is possible to make various changes and modifications to the embodiment without departing from the spirit of the invention, and it is clear that the present invention encompasses various equivalents to the embodiment and such changes and modifications.

In the above embodiment, the vehicle is a motorcycle. However, the vehicle is not limited to motorcycles. The vehicle may be a four-wheeled motorcar or a motor tricycle.

In the above embodiment, the headlight unit includes a heatsink. However, the headlight unit does not need to include a heatsink. When the amount of heat generated from the LEDs is small, the heatsink is not necessary.

In the above embodiment, the headlight unit includes a white LED and a yellow LED. However, the headlight unit may include LEDs emitting lights of colors other than white and yellow. In sum, in various non-limiting embodiments, one of the LEDs is an LED to emit high-color-temperature light, while the other is an LED to emit low-color-temperature light.

In the above embodiment, the white LED is disposed on the left side of the yellow LED. However, the white LED may be disposed on the right side of the yellow LED. In the above embodiment, the white LED and the yellow LED are disposed symmetrically about the center line of the condenser lens. However, the white LED and the yellow LED are not required to be disposed symmetrically about the center line of the condenser lens. In various non-limiting embodiments, the white LED and the yellow LED are arranged side by side in the right-left direction.

In the above embodiment, the headlight unit includes two LEDs. The number of LEDs included in the headlight unit is not limited to two. In various non-limiting embodiments, the headlight unit includes two or more LEDs.

In the above embodiment, the white LED and the yellow LED are disposed nearer to the center line of the condenser lens than to the left end and the right end of the condenser lens. The recitation "disposed nearer to the center line" includes a case where the white LED or the yellow LED is disposed to cross the center line with respect to the right-left direction when the case is viewed in the up-down direction.

In the above embodiment, when the rider operates the volume controller or his/her smartphone, the quantity of light emitted from the white LED and the quantity of light emitted from the yellow LED are adjusted. However, the light-quantity adjustment of the white LED and the yellow LED is not limited to the cases where the light-quantity adjustment is carried out in response to the rider's operation. The light-quantity adjustment of the white LED and the yellow LED may be carried out without any rider's operations. For example, when the vehicle includes an optical sensor, a camera or the like, the quantity of light emitted from the white LED and the quantity of light emitted from the yellow LED may be adjusted automatically in response to the output from the optical sensor, the camera or the like.

In the above embodiment, the electric currents flowing through the white LED and the yellow LED are controlled by PWM control. However, the way of controlling the electric currents flowing through the white LED and the yellow LED is not limited to PWM control. The electric currents flowing through the white LED and the yellow LED may be controlled with the duty cycle kept constant.

The terms and words used in this specification are to describe the present invention and not to limit the interpretation of the present invention. The present invention does not exclude any equivalents to the features described in the specification, and encompasses various changes and modifications as long as they are in the scope of claims.

The present invention can be carried out in a variety of forms. This specification should be considered as what provides embodiments to implement the principle of the present invention. This specification provides preferred embodiments with descriptions and/or drawings, with the understanding that the present invention is not to be considered limited to what is shown in the drawings and described in the specification.

The present invention encompasses all embodiments including any equivalents, modifications, deletions, combinations (combinations of various embodiments), improvements and changes which are obvious to those skilled in the art from the embodiments described in this specification. The subject matter of the claims is to be interpreted broadly based on the language in the claims, and is not to be limited to the embodiments described in this specification or added during the prosecution of the present application. Those embodiments are to be considered non-exclusive.

What is claimed is:

1. A low-beam-color-temperature-variable headlight unit comprising:
 a case;
 a condenser lens including a low-beam output surface from which a low beam outgoes, a light receiving surface located behind the low-beam output surface with respect to a front-back direction of the case;
 a high-color-temperature light emitting diode located inside the case, at a position nearer to a center line of the light receiving surface than to a right end and a left end of the light receiving surface with respect to a right-left direction of the case, the high-color-temperature light emitting diode configured to illuminate a first illuminated area with light passing through the light receiving surface and outgoing from the low-beam output surface, and the high-color-temperature light emitting diode including a high-color-temperature light emitting surface from which high-color-temperature light is emitted;
 a low-color-temperature light emitting diode located inside the case, side by side with the high-color-temperature light emitting diode in the right-left direction of the case, at a position nearer to the center line of the light receiving surface than to the right end and the left end of the light receiving surface with respect to the right-left direction of the case, the low-color-temperature light emitting diode configured to illuminate a second illuminated area, which overlaps the first illuminated area at least partly, with light passing through the light receiving surface and outgoing from the low-beam output surface, and the low-color-temperature light emitting diode including a low-color-temperature light emitting surface from which low-color-temperature light is emitted; and
 a low-beam-color-temperature control unit capable of adjusting a color temperature of the low beam by adjusting a quantity of light emitted from the high-color-temperature light emitting diode and a quantity of light emitted from the low-color-temperature light emitting diode.

2. The low-beam-color-temperature-variable headlight unit according to claim 1, wherein
 the high-color-temperature light emitting surface and the low-color-temperature light emitting surface are disposed symmetrically about the center line of the light receiving surface with respect to the right-left direction.

3. The low-beam-color-temperature-variable headlight unit according to claim 1, wherein
 the high-color-temperature light emitting diode is a white light emitting diode, and the low-color-temperature light emitting diode is a yellow light emitting diode.

4. The low-beam-color-temperature-variable headlight unit according to claim 1, wherein
 after a light-quantity adjustment, the quantity of light emitted from the low-color-temperature light emitting diode is greater than the quantity of light emitted from the high-color-temperature light emitting diode.

5. The low-beam-color-temperature-variable headlight unit according to claim 1, wherein
 after a light-quantity adjustment, a total of the quantity of light emitted from the high-color-temperature light emitting diode and the quantity of light emitted from the low-color-temperature light emitting diode is equal to a maximum quantity of light the high-color-temperature light emitting diode can emit during operation.

6. The low-beam-color-temperature-variable headlight unit according to claim 1, wherein
 after a light-quantity adjustment, the quantity of light emitted from the high-color-temperature light emitting diode is equal to a maximum quantity of light the high-color-temperature light emitting diode can emit during operation, and the quantity of light emitted from the low-color-temperature light emitting diode is equal to a maximum quantity of light the low-color-temperature light emitting diode can emit during operation.

7. The low-beam-color-temperature-variable headlight unit according to claim 1, wherein
 after a light-quantity adjustment, the quantity of light emitted from the high-color-temperature light emitting diode is equal to a maximum quantity of light the high-color-temperature light emitting diode can emit during operation, and the quantity of light emitted from the low-color-temperature light emitting diode is less than a maximum quantity of light the low-color-temperature light emitting diode can emit during operation.

8. The low-beam-color-temperature-variable headlight unit according to claim 1, wherein
 after a light-quantity adjustment, the quantity of light emitted from the high-color-temperature light emitting diode is less than a maximum quantity of light the high-color-temperature light emitting diode can emit during operation, and the quantity of light emitted from the low-color-temperature light emitting diode is equal to a maximum quantity of light the low-color-temperature light emitting diode can emit during operation.

9. The low-beam-color-temperature-variable headlight unit according to claim 1, wherein
 after a light-quantity adjustment, the quantity of light emitted from the high-color-temperature light emitting diode is less than a maximum quantity of light the high-color-temperature light emitting diode can emit during operation, and the quantity of light emitted from the low-color-temperature light emitting diode is less than a maximum quantity of light the low-color-temperature light emitting diode can emit during operation.

10. The low-beam-color-temperature-variable headlight unit according to claim 1, wherein
 the low-beam-color-temperature control unit adjusts the quantity of light emitted from the high-color-temperature light emitting diode and the quantity of light emitted from the low-color-temperature light emitting diode in response to a signal sent from a mobile terminal.

11. The low-beam-color-temperature-variable headlight unit according to claim 1, wherein
 an overlap area where the first illuminated area and the second illuminated area overlap each other is greater than a portion of the first illuminated area without overlapping the second illuminated area and greater than a portion of the second illuminated area without overlapping the first illuminated area.

\* \* \* \* \*